US010454735B2

United States Patent
André et al.

(10) Patent No.: US 10,454,735 B2
(45) Date of Patent: Oct. 22, 2019

(54) METHOD AND PEAK REDUCTION UNIT FOR LIMITING A PEAK OR GROUP OF PEAKS OF AN AGGREGATED BASEBAND CARRIER SIGNAL IN A RADIO TRANSMITTER

(71) Applicant: Telefonaktiebolaget LM Ericsson (publ), Stockholm (SE)

(72) Inventors: Tore André, Älvsjö (SE); Daniel Larsson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/755,826

(22) PCT Filed: Oct. 15, 2015

(86) PCT No.: PCT/SE2015/051098
§ 371 (c)(1),
(2) Date: Feb. 27, 2018

(87) PCT Pub. No.: WO2017/065660
PCT Pub. Date: Apr. 20, 2017

(65) Prior Publication Data
US 2018/0331873 A1 Nov. 15, 2018

(51) Int. Cl.
*H04B 1/16* (2006.01)
*H04L 27/26* (2006.01)
*H04B 1/00* (2006.01)

(52) U.S. Cl.
CPC ....... *H04L 27/2614* (2013.01); *H04B 1/0067* (2013.01); *H04L 27/2624* (2013.01)

(58) Field of Classification Search
CPC .............. H04L 25/025; H04B 2201/707
(Continued)

(56) References Cited

U.S. PATENT DOCUMENTS

| 8,948,303 B1* | 2/2015 | Van Cai | H04L 27/2624 375/296 |
|---|---|---|---|
| 2013/0177057 A1 | 7/2013 | Pavel et al. | |
| 2014/0044215 A1* | 2/2014 | Mundarath | H04L 27/2624 375/297 |

OTHER PUBLICATIONS

International Search Report and Written Opinion of the International Searching Authority for International Application No. PCT/SE2015/051098 dated Jul. 19, 2016, 15 pages.

(Continued)

*Primary Examiner* — Tu X Nguyen
(74) *Attorney, Agent, or Firm* — Sage Patent Group

(57) ABSTRACT

This disclosure relates to a peak reduction circuit and method for reducing peaks by identifying peak sample values exceeding a pre-set threshold value in an aggregated baseband carrier signal and determining a maximum peak sample by detecting its maximum peak absolute value and phase. A search is performed a pre-determined search length beyond an identified peak. A stored, predetermined filter impulse response based on the carrier passband configuration is retrieved and its amplitude and phase of the predetermined filter impulse response is adjusted by means of the phase and absolute value of the determined maximum peak sample. Finally, the aggregated baseband carrier signal and the adjusted predetermined filter impulse response are combined by synchronizing their maximum peaks and their opposite phase values for adjusting the aggregated baseband carrier signal to said pre-set threshold value.

11 Claims, 12 Drawing Sheets

(58) Field of Classification Search
USPC .............................. 455/139, 168.1, 202, 210
See application file for complete search history.

(56) References Cited

OTHER PUBLICATIONS

Hanson, "Design Specification for cfr," Revision A, 1_102 62-CAH 109 2482/1, Ericsson, Jul. 4, 2014, 12 pages.
Eguifen, "Crest Factor Reduction Module," Revision PA1, 102 62-CXC 112 3631 Uen, Ericsson, Nov. 30, 2011, 3 pages.
Han et al., "An Overview of Peak-to-Average Power Ratio Reduction Techniques for Multicarrier Transmission," Modulation, Coding and Signal Processing for Wireless Communications, IEEE Wireless Communications, Apr. 2005, 10 pages.
Jiang et al., "An Overview: Peak-to-Average Power Ratio Reduction Techniques for OFDM Signals," IEEE Transactions on Broadcasting, vol. 54, No. 2, Jun. 2008, 12 pages.
Texas Instruments, "Crest Factor Reduction Processor," GC1115, SLWS144D—Feb. 2005, Revised Apr. 2009, 81 pages.
Dan et al., "Performance of Peak Cancellation for PAPR Reduction in OFDM System," IEEE, 2008, 5 pages.
Andre, "Technical Report CFR methods," Revision PB2, 1/0363-80/FCP1034475 Uen, Ericsson, Mar. 2, 2015, 45 pages.
Hemphill et al., "Peak Cancellation Crest Factor Reduction Reference Design," XILINX, XAPP1033 (v1.0), Nov. 18, 2007, 31 pages.

\* cited by examiner

METHOD AND PEAK REDUCTION UNIT FOR LIMITING A PEAK OR GROUP OF PEAKS OF AN AGGREGATED BASEBAND CARRIER SIGNAL IN A RADIO TRANSMITTER

CROSS REFERENCE TO RELATED APPLICATION

This application is a 35 U.S.C. § 371 national stage application of PCT International Application No. PCT/SE2015/051098, filed on Oct. 15, 2015, the disclosure and content of which is incorporated by reference herein in its entirety.

TECHNICAL FIELD

The present technology relates to a method and a device in a wireless communication network. In more detail, this disclosure provides a method and unit for limiting peaks in signals in transmitters.

BACKGROUND

Multi Standard Radio (MSR) transmitters are used in, e.g. base stations supporting different radio access technologies such as LTE, WCDMA, GSM, etc. A schematic design of a MSR is illustrated in FIG. 1. Said MSR transmitters suffer from high PAR values, i.e. a high ratio between peak power and average power of the signal. This is a consequence of the central limit theorem and of that many signals are added together. The resulting real and imaginary components of the signal will approach Gaussian distributions and the amplitude will approach a Rayleigh distribution.

It is important to limit the PAR in order to get good efficiency of the Power Amplifier (PA). For limiting PAR a Crest Factor Reduction, CFR, algorithm may be used.

In FIG. 2 is a digital input signal illustrated wherein sample amplitude values are illustrated as dots. Some of the sample values exceed a threshold TR. A peak is herein defined by a group of samples above a certain threshold value TR. In FIG. 3, two groups of samples exceed the threshold value. The two groups are separated by a sample whose amplitude value is less than TR. The part of a sample amplitude value overshooting or exceeding a threshold is illustrated. This is the peak absolute value, i.e. the absolute value of the peak sample.

The most straightforward way would be to just clip the signal at a chosen threshold, see FIG. 4. This would however result in out of band spectrum emission, something that is not acceptable in a MSR transmitter.

In said MSR transmitter, an aggregated baseband carrier signal is generated and modulated to radio frequency before being powered up and transmitted. Said aggregated baseband carrier signal comprises carrier passbands, wherein each carrier is allocated to a carrier passband which passbands are separated by intermediate free frequency bands. Said passbands and intermediate free frequency bands are allocated according to a carrier passband configuration in the baseband. An example of such a carrier passband configuration is illustrated in FIG. 5. One condition for a MSR transmitter is that said intermediate free frequency bands should be free and clean from frequency components and signal energy generated by the transmitter. Thus, the transmitter should not generate signals outside its transmission band.

A useful CFR algorithm must therefore be able to limit the PAR and limit the out of band emission without too much increase of the Error Vector Magnitude, EVM, which is a measure of the distortion of the signal.

Peak Cancellation is one of the most common CFR algorithm used today for reducing a peak in a signal by adding a band limited pulse to cancel the peak. Only the highest sample in the peak is used for determining the amplitude and phase of the subtracted pulse.

Peak cancellation comprises three stages: peak extraction, peak detection and peak cancellation.

The purpose of the peak extraction is to identify all samples that have an absolute value above the threshold value. For Peak Cancellation it is also necessary to identify the largest sample in each group of samples above the threshold value. This is called Peak Detection. This sample is the only value that is used for the peak cancellation.

There are a two classical peak detectors used for Peak Cancellation CFR. The simplest one looks for the first sample in the interval over the threshold value that is larger than its neighbors. The drawback with this method is that it there is a risk that a local maximum is detected as the largest sample.

A better but more complex method is to actually find the largest sample in the interval. As soon as the interval has ended, i.e. one sample is below the threshold, the algorithm selects the so far largest sample.

In case of several carriers as in a MSR transmitter, a set of narrow peaks occur within a very short time range, as illustrated in FIG. 7. FIG. 7 is a graph diagram illustrating the amplitude of peaks over a threshold value TR as a function of time. Each dot is a sample. Within a time interval, nine narrow peaks of samples exceeding the threshold value TR occur. The classical peak detector would in this case identify each peak and the algorithm would try to cancel each peak separately. This will be very inefficient.

If each narrow peak is detected separately the number of peaks will be too high to handle.

SUMMARY

The object of the following disclosure is to provide an improved CFR peak cancellation technique.

According to one aspect of the provided technique, it is provided a method and embodiments thereof for limiting a peak or group of peaks of an aggregated baseband carrier signal to a threshold value. Said aggregated baseband carrier signal comprises digital carrier signals allocated to passbands which are separated by intermediate free frequency bands. Said passbands and intermediate free frequency bands are distributed according to an aggregated carrier passband configuration in the frequency baseband. One or more samples of the aggregated baseband carrier signal form a peak or group of peaks, which samples are complex having absolute values exceeding a threshold value. A peak value comprises a peak absolute value, which is the difference between the absolute value of the corresponding sample and the threshold value, and the phase of the corresponding sample. Said method comprises the steps of delaying an aggregated baseband carrier signal, identifying samples constituting a peak or a group of peaks by determining the peak absolute values and a maximum absolute peak value of said peak or group of peaks within a predetermined search length, L, from each identified peak, and determining the phase value and a synchronization time for the sample corresponding to the peak maximum absolute value. The method further comprises the steps of retrieving a stored, predetermined filter impulse response comprising samples constituting a peak or a group of peaks determined according to the aggregated carrier passband configuration, wherein one peak sample is a maximum peak sample, adjusting the samples of the predetermined filter impulse response using the phase value and the peak maximum absolute value of the maximum peak sample, and combining the delayed aggregated baseband carrier signal and the adjusted predetermined filter impulse response by synchronizing their maximum peak samples using the synchronization time and their opposite phase values resulting in an output aggregated baseband signal wherein each sample is limited within the threshold value.

According to further one aspect, it is provided a peak reduction unit and embodiments thereof for limiting a peak or group of peaks of an aggregated baseband carrier signal to a threshold value. Said aggregated baseband carrier signal comprises digital carrier signals allocated to passbands which are separated by intermediate free frequency bands. Said passbands and intermediate free frequency bands are distributed according to an aggregated carrier passband configuration in the frequency baseband, wherein one or more samples of the aggregated baseband carrier signal form a peak or group of peaks, which samples are complex having absolute values exceeding a threshold value. A peak value comprises a peak absolute value, being the difference between the absolute value of the corresponding sample and the threshold value, and the phase value of the corresponding sample. The peak reduction unit comprises a delay buffer for receiving and delaying an aggregated baseband carrier signal, and a controller for controlling a peak extractor unit, and a peak determination unit. The peak extractor unit is adapted to identify samples constituting a peak or a group of peaks by determining the peak absolute values. The peak determination unit is adapted to determine a peak maximum absolute value of said peak or group of peaks within a predetermined search length, L, from each identified peak and to determine the phase value for the sample corresponding to the peak maximum absolute value. The controller unit comprises a processor and/or control logic which is adapted to determine a synchronization time for the sample corresponding to the peak maximum absolute value and to retrieve from a storage a stored, predetermined filter impulse response determined according to the aggregated carrier passband configuration and comprising samples constituting a peak or a group of peaks, wherein one peak sample is a maximum peak sample. The peak reduction unit further comprises a multiplication unit configured to adjust the samples of the predetermined filter impulse response using the phase value and the maximum peak absolute value of the maximum peak sample, and a combining unit adapted to combine the delayed aggregated baseband carrier signal and the adjusted predetermined filter impulse response, wherein the controller is adapted to synchronize by using the synchronization time their maximum peaks and their opposite phase values resulting in an output aggregated baseband signal wherein each sample is limited within the threshold value.

According to further one aspect, a radio transmitter of a radio base station is provided, wherein said radio transmitter comprises a peak reduction unit as described above.

One advantage is that the disclosed technique provides a more efficient method and device for reducing peaks and surrounding sub-peaks than known methods and devices.

BRIEF DESCRIPTION OF THE DRAWINGS

The foregoing, and other, objects, features and advantages of the present technique will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present technique. However, it will be apparent to one skilled in the art that the present technique may be practiced in other embodiments that depart from these specific details. In other instances, detailed descriptions of well-known methods, devices, and circuits are omitted so as not to obscure the description of the present technique with any unnecessary detail.

Figure 1:
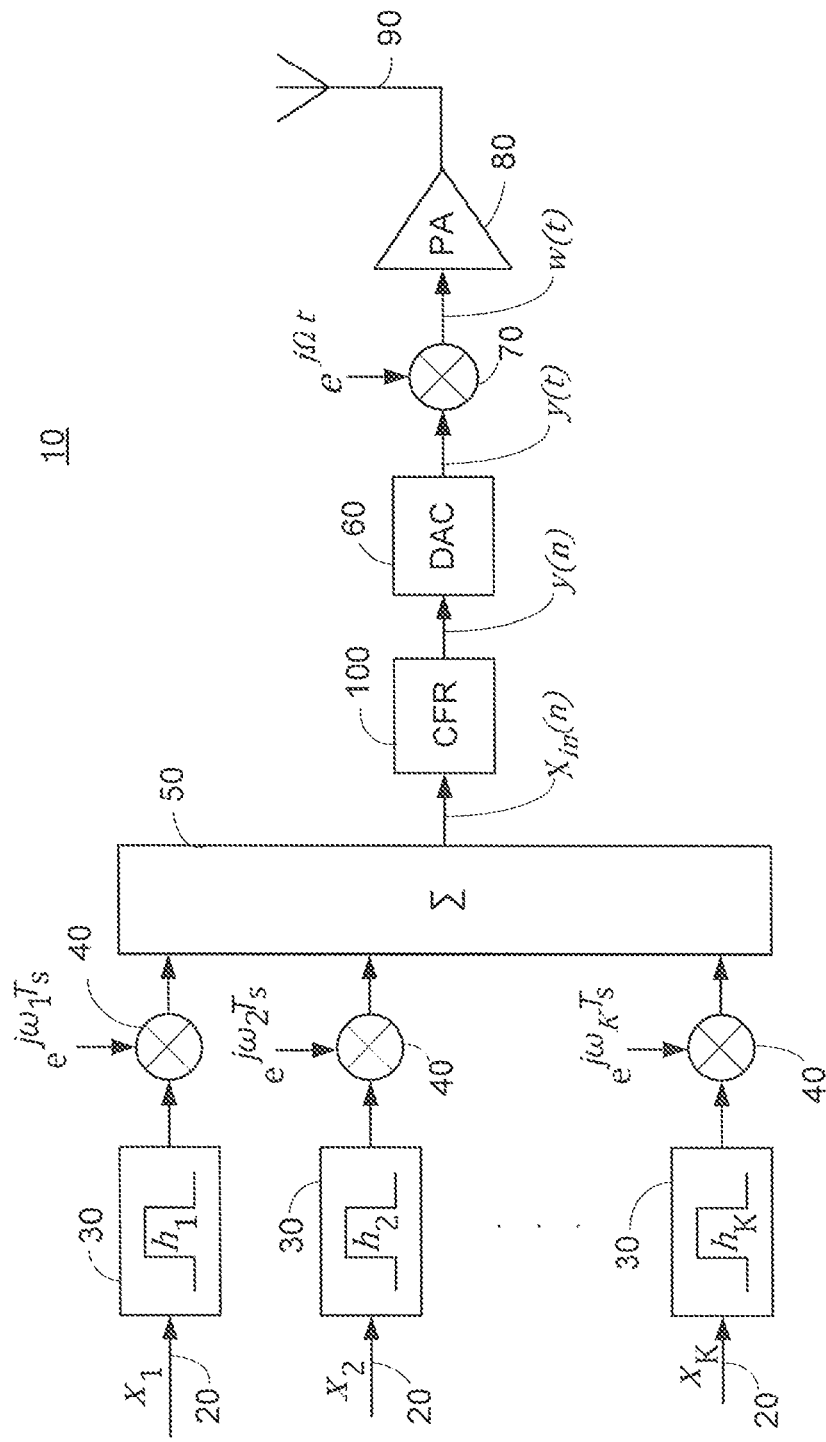
FIG. 1 is a block diagram of an exemplary part of a radio transmitter equipment in which units and methods described herein may be implemented.
Figure 2:
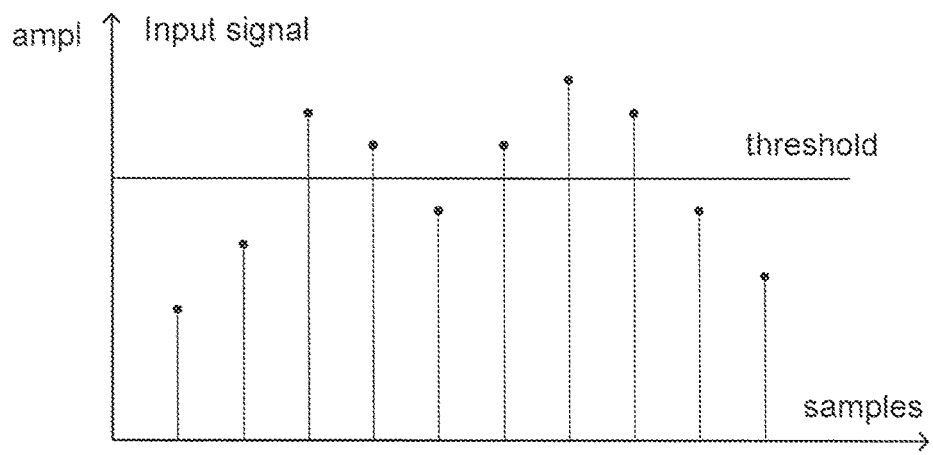
FIG. 2 is illustrating amplitude as a function of time diagram of a digital input signal.
Figure 3:
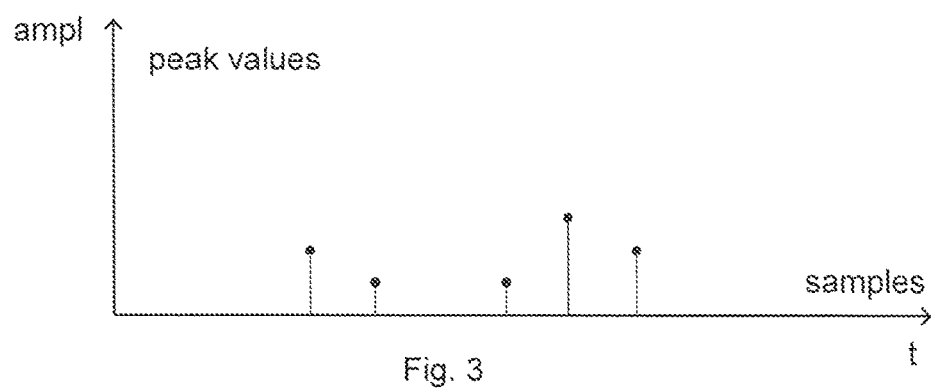
FIG. 3 is illustrating peak values as a function of time diagram of a digital input signal.
Figure 4:
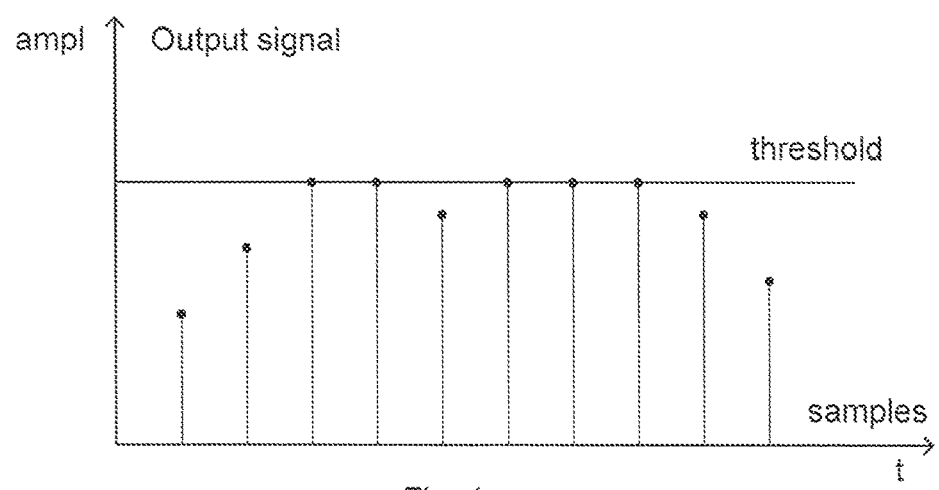
FIG. 4 is illustrating amplitude as a function of time diagram of a digital output signal after peak cancellation.

FIG. 1 is illustrating a part of a radio transmitter equipment.

The radio transmitter equipment 10 may be situated in a radio base station, e.g. eNB. The transmitter equipment comprises a signal summation device 50 connected to different input branches 20. Each branch 20 can be dedicated to a radio standard e.g. WCDMA, GSM, LTE, etc. An input signal on a branch is digital and comprises coded digital information. The digital signal is baseband filtered by a passband filter 30 and modulated according to a modulation scheme to a carrier signal having a carrier frequency $\omega_k$, k=1, 2, . . . , K. The different carrier frequencies $\omega_k$, k=1, 2, ..., K, constitute a carrier configuration wherein each carrier is dedicated to a passband, wherein adjacent passbands are separated by an attenuation band. The signal aggregation device 50 adds each carrier to an aggregated baseband carrier signal on a single signal. Said baseband carrier signal is defined as $$x_{in}(n)=\sum_{k=1}^{K}(x_k(n)*h_k)e^{j\omega_k n T_s} \qquad \text{eq. (1)}$$

wherein K is the number of carriers, and $h_k$ is the impulse response of each carrier filter k, n is sample numbering, and $T_s$ is the sampling period, $T_s=1/f_s \cdot f_s$ is the sampling frequency.

Said aggregated baseband carrier signal comprises carrier signals in passbands, wherein each carrier is allocated to a carrier passband which passbands are separated by intermediate free frequency bands. Said passbands and intermediate free frequency bands are allocated according to a carrier passband configuration in the baseband. In the formula, eq. (1), wherein "*" indicates convolution.

Figure 5:
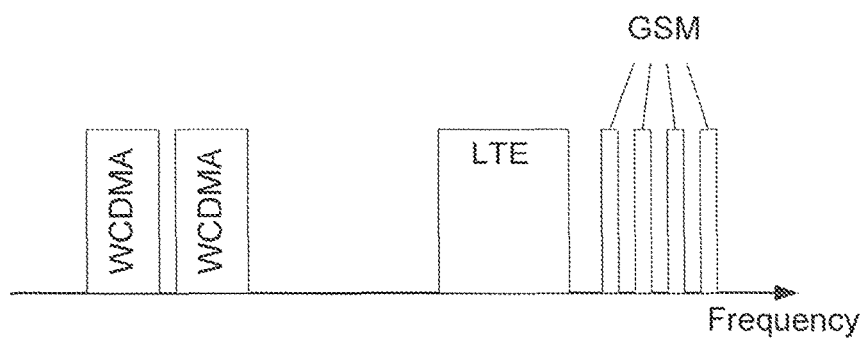
FIG. 5 is a frequency diagram showing an example of a carrier configuration.

An example of a carrier configuration of a digital aggregated multi standard carrier signal is illustrated in FIG. 5.

FIG. 5 is a frequency diagram showing an example of a carrier configuration H(ω).

According to the illustrated example, the carriers $x_k$, k=1, 2, ..., K of different radio standards such as WCDMA, LTE and GSM are dedicated to different passbands: two WCDMA passbands in lower passbands, four GSM passbands in higher frequency passbands, and a LTE passband there between. The carrier itself can use any modulation scheme like e.g. OFDM. This is a multicarrier scheme but in this context we consider it as one carrier as it has a continuous spectrum. In a multi standard radio several carriers of possibly several types, e.g. different standards like LTE, GSM and WCDMA, are combined and transmitted using a common PA and antenna. The carrier can have an arbitrary position within the total band.

The carrier configuration H(ω) will put special requirements on a Crest Factor Reduction, CFR, algorithm. The typical shape of a peak will look very different compared to a single carrier system, see graph diagrams in FIGS. 15, 16 and 17. A particular difficult case is the case where there are several narrow band carriers separated in frequency. A special method for limiting a peak to average ratio (PAR) of a baseband carrier signal using a filter impulse response based on the carrier passband configuration used is therefore provided herein and is presented herein below starting in FIG. 1.

Back to FIG. 1, wherein the digital aggregated multi standard baseband carrier signal $x_{in}$ is fed to a CFR block 100 for peak cancellation.

The CFR block, or peak reduction unit 100 is adapted to apply a herein presented method for reducing peaks in a digital aggregated multi standard (MSR) baseband carrier signal $x_{in}$ of a multi standard radio transmitter.

$$y(n)=x_{in}(n)-h_{tot}(m)x_{peak}, \qquad \text{eq. (2)}$$

Where m is the sample numbering of the stored impulse, m=1, ..., M during the duration of the stored impulse response $h_{tot}$. M is the length of $h_{tot}$, e.g. a pre-determined number of samples. M is arranged so that the peak of $h_{tot}$ coincide with the peak in $x_{in}$. $h_{tot}$ is the impulse response of the aggregation/combination (convolution) of all carrier filters 30 transposed to their individual position in the frequency band. $x_{peak}$ is the complex valued peak sample. $x_{peak}$ is the final complex correction factor determined for a group of peak samples. Said correction factor is used for adjusting the stored impulse response $h_{tot}$ before reducing the peak of the aggregated baseband carrier signal $x_{in}(n)$.

When the peaks of the baseband signal have been cancelled, or at least essentially reduced, by the peak reduction unit or CFR block 100, the base band out put signal $$y(n)=\text{CFR}(x_{in}(n)) \qquad \text{eq. (3)}$$

is converted from digital to analogue y(t) by a digital-to-analogue converter, DAC, 60 and the analogue signal is modulated up to the transmitting frequency in the Giga-Hertz radio frequency band by a modulator 70. The radio signal $$w(t)=y(t)e^{j\Omega t} \qquad \text{eq. (4)}$$

is power amplified by a power amplifier 80 to the controlled power level and fed to the antenna stage 90 for transmission over the air interface to different mobile terminals or other mobile user equipments, such as smart phones, mobile phones, laptops, etc.

Figure 6:
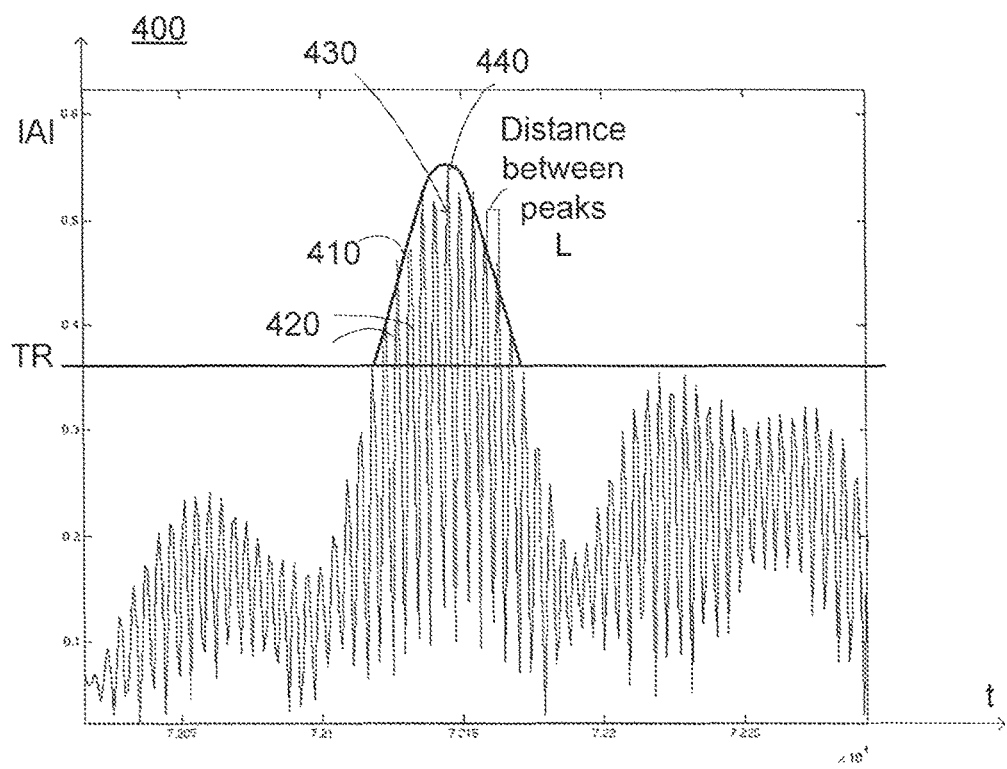
FIG. 6 is a graph diagram illustrating an example of shape of a filter impulse response.

FIG. 6 is a graph diagram illustrating an example of a shape of an aggregated filter impulse response 400.

As could be seen in the example of FIG. 6, the aggregated filter impulse response 400 may involve a number of narrow peaks, sub-peaks, 420. The aggregated filter impulse response 400 is dependent on the carrier configuration.

In some carrier configurations, e.g. the case where there are several narrowband carriers with some separation, a burst with several narrow peaks can constitute an impulse response peak 410.

The impulse response peak 410 actually consists of many narrow peaks, sub-peaks 420, with a distance proportional to the distance between the carriers. The shape of the burst defines an envelope, indicated with a thick line in the drawing, of the impulse response peak 410, and the envelope is dependent on the bandwidth of the carriers.

One of the sub-peaks is a maximum sub-peak 430, which comprises a maximum sample value 440 of all sub-peaks.

Further, it is illustrated in FIG. 6, one distance L between sub-peaks. If the threshold is set as in FIG. 6, only one group of peaks 410 is involved. If instead the threshold TR is set to a lover amplitude value, a neighbouring lower group of peaks has also to be reduced. To be effective, the method separates the peak reduction process into separate processes. This is achieved by continuing the search for a search length a calculated number of sample values defined as a search length L after each peak or sub-peak. The determining of the search length is performed for a certain carrier configuration, see description below referring to FIGS. 13 and 14.

Figure 7:
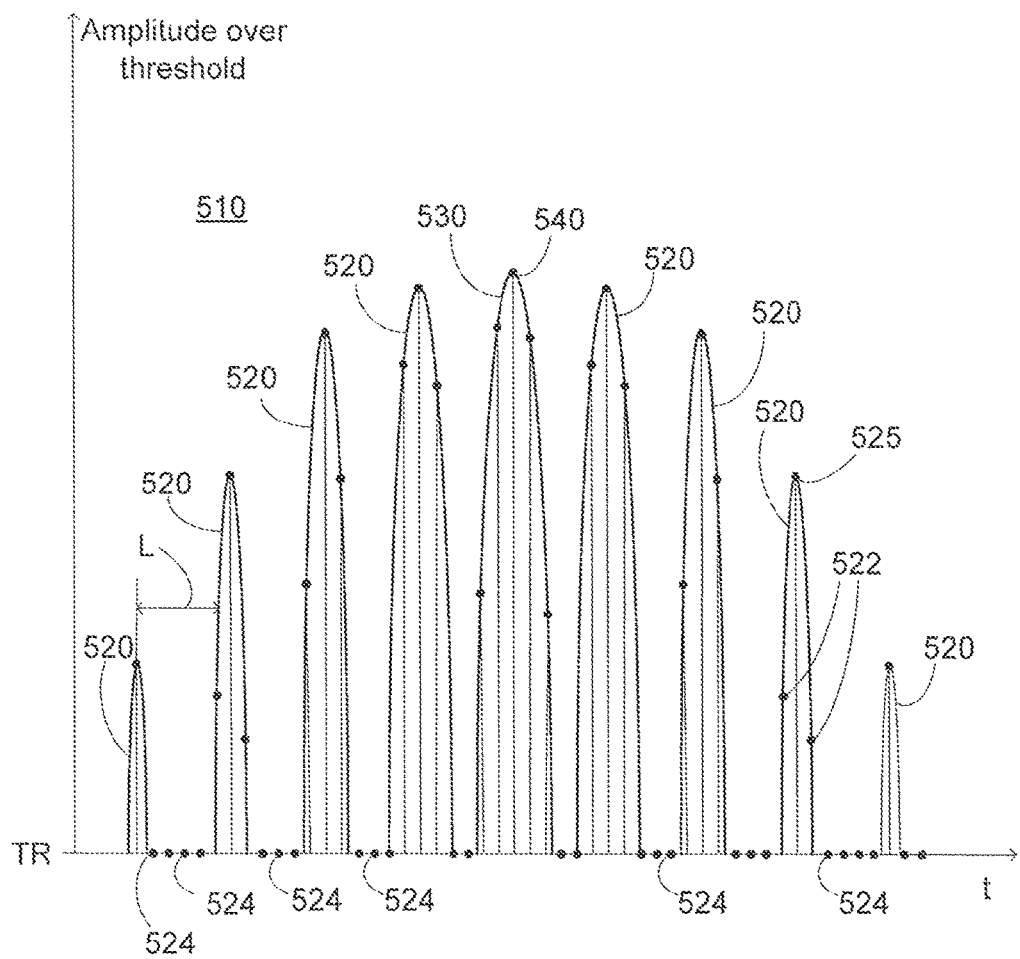
FIG. 7 is illustrating peak amplitude samples over a threshold as a function of time of a digital input signal.

FIG. 7 is illustrating peak amplitude samples over a threshold as a function of time of a digital input signal. Said input signal comprises a burst with several narrow peaks. In line with the reasoning regarding the impulse response peak in FIG. 6, said burst can be considered as a peak 510 comprising a group of sub-peaks 520. Each sub-peak 520 comprises one or more samples 522 whose absolute value exceeds the threshold value TR. Thus, a group of samples constitutes a sub-peak. Before and after a sub-peak, at least one sample 524 is less or equal to threshold value TR.

One of the sub-peaks is a maximum sub-peak 530, which comprises a maximum sample value 540 of all sub-peaks.

The method makes use of a stored and predetermined impulse response, which is similar to the aggregated impulse response of the carrier filters 30. In case of several carriers it is a combination of impulse responses of all carrier filters 30, each filter 30 modulated to the correct frequency within the multi carrier frequency band. Said impulse response peak can be generated in advance and it is only dependent on carrier configuration. Thus, in dependence of the carrier configuration, e.g. the number of carriers, the bandwidths of the carrier passbands and the distances between the carriers, it is possible to determine an impulse response.

Figure 15:
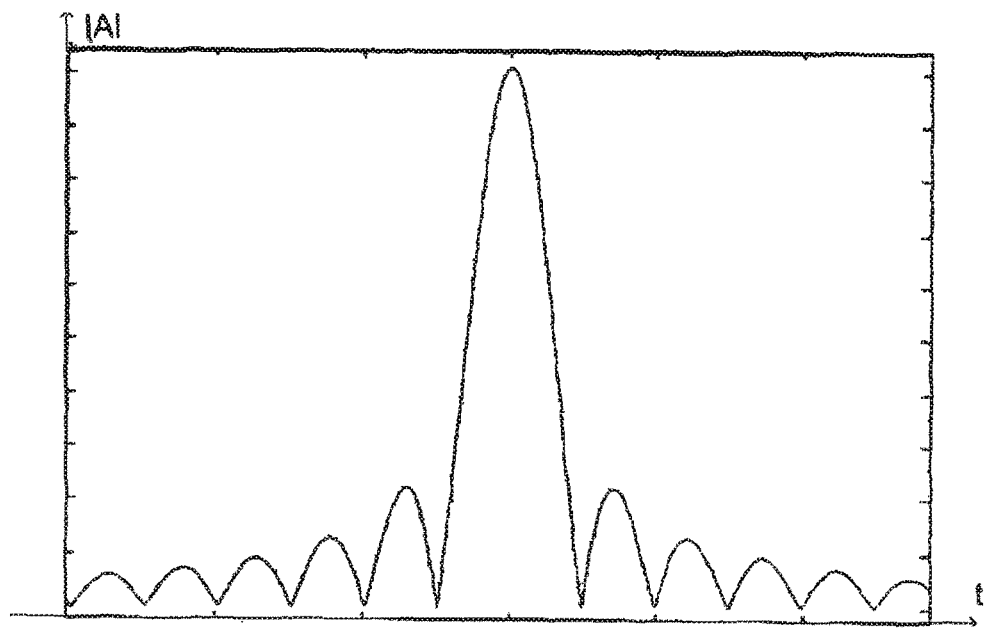
FIG. 15 is a graph diagram illustrating a characteristic example of a filter impulse response comprising one single carrier.
Figure 16:
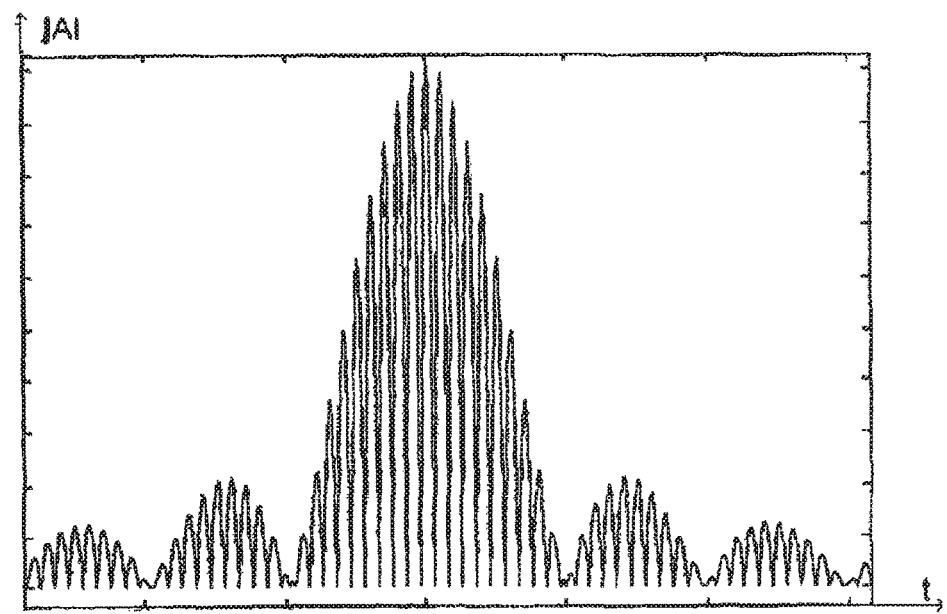
FIG. 16 is a graph diagram illustrating a characteristic example of a filter impulse response comprising two carriers.

Said impulse response may comprise different number of sub-peaks as illustrated in FIGS. 15 and 16. In FIG. 15, which illustrates the impulse response for a single carrier, the impulse response peak comprises no sub-peaks. The impulse response peak for two carrier configuration, as illustrated in FIG. 16, comprises a great number of sub-peaks.

For a peak in the input signal exceeding a threshold value TR with a certain amount, a peak with an amplitude of at least a similar amount as the certain amount and an opposite phase as the peak in the input signal is generated and subtracted from the input signal, said peak being based on the impulse response peak.

Some peak regrowth can occur so the algorithm can need to be run several times. As the impulse response peak consists of a group of samples before and after the highest sample the signal needs to be delayed in order to make it possible to subtract the impulse correctly.

The important thing is then to find the highest sample in the group of sub-peaks constituting a peak in the input signal. This can be done by increasing the search length beyond the first sample which absolute value is less or equal to the threshold value TR. After that the end of a narrow peak has been found, the algorithm continues to search for high sample values for a predefined number of samples. This extra search length L shall be long enough to find next narrow peak but not so long that it is extended into next group of narrow peaks, i.e. impulse response peak. The number of extra samples used in the search is dependent on carrier configuration and can be calculated in advance.

By adjusting amplitude and phase of the predetermined filter impulse response by means of phase and amplitude information of the determined maximum peak sample in the input signal, and combining the input signal, i.e. the aggregated baseband carrier signal, and the adjusted predetermined filter impulse response and synchronizing their maximum peak positions and their opposite phase values resulting in an output aggregated baseband carrier signal adjusted to the pre-set threshold value.

Said combining results in an output aggregated baseband carrier signal adjusted within an amplitude swing of the power amplifier, said swing corresponding to the pre-set threshold value.

Figure 8:
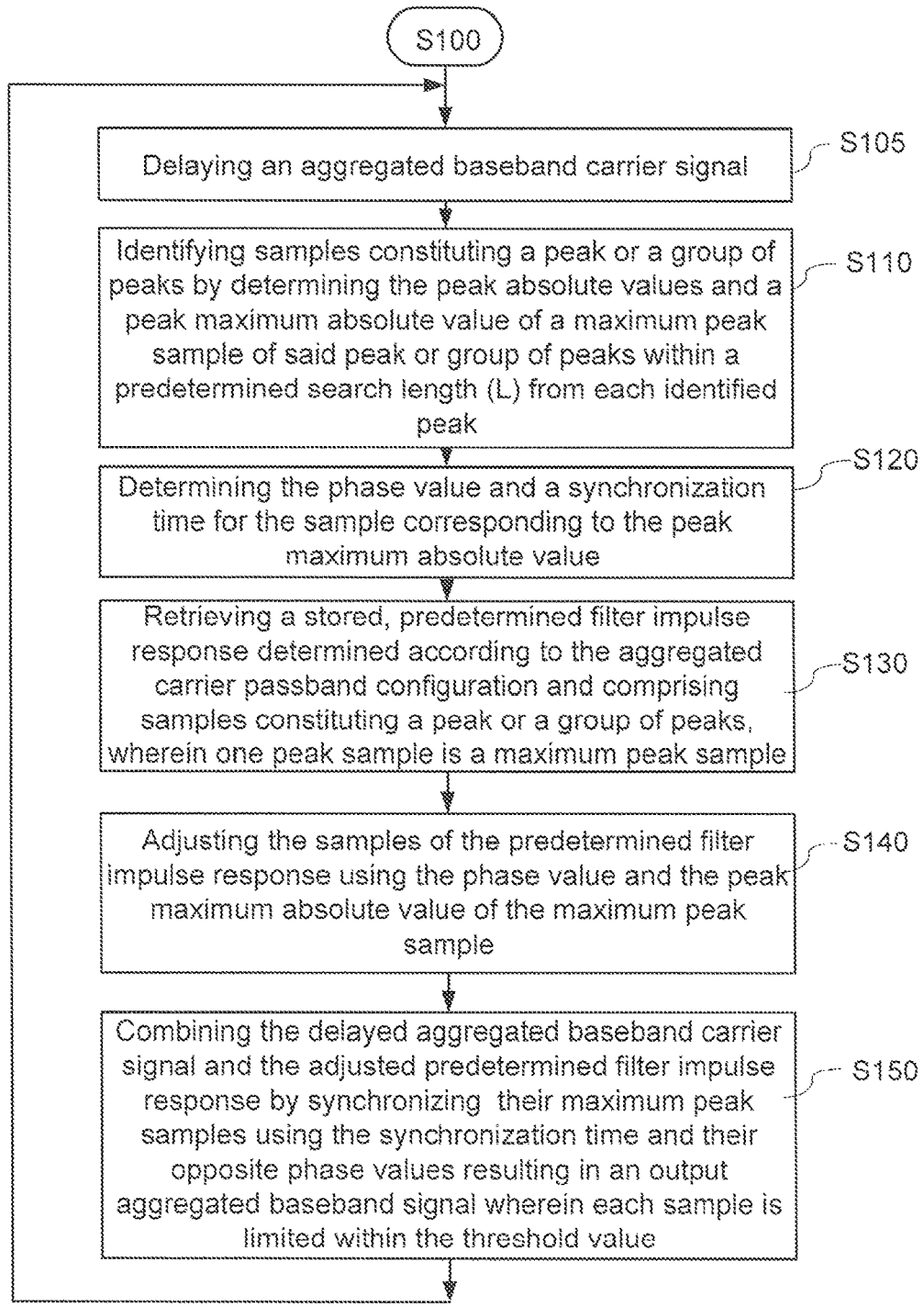
FIG. 8 is a flowchart of the method for peak reduction presented in this disclosure.

FIG. 8 is a flowchart of the method for peak cancellation presented in this disclosure. The CFR block, i.e. peak reduction unit 100, provides a new method for peak reduction, or Crest Factor Reduction. It is a method for limiting a peak or group of peaks simultaneously of an aggregated baseband carrier signal to a threshold value.

Said aggregated baseband carrier signal comprises digital carrier signals allocated to passbands which are separated by intermediate free frequency bands. Said passbands and intermediate free frequency bands are distributed according to an aggregated carrier passband configuration in the frequency baseband.

One or more samples of the aggregated baseband carrier signal form a peak or group of peaks, which are complex having absolute values exceeding a threshold value, TR. A peak value comprises a peak absolute value being the difference between the absolute value of the corresponding sample and the threshold value and the phase of the corresponding sample.

The method comprises the steps of:
S105:—Delaying an aggregated baseband carrier signal;
S110:—Identifying samples constituting a peak or a group of peaks by determining the peak absolute values of the samples and a peak maximum absolute value of a maximum peak sample of said peak or group of peaks within a predetermined search length, L, from each identified peak;
S120:—Determining the phase value and a synchronization time for the sample corresponding to the peak maximum absolute value;
S130:—Retrieving a stored, predetermined filter impulse response determined according to the aggregated carrier passband configuration and comprising samples constituting a peak or a group of peaks, wherein one peak sample is a maximum peak sample;
S140:—Adjusting the samples of the predetermined filter impulse response using the phase value and the peak maximum absolute value of the maximum peak sample;
S150:—Combining the delayed aggregated baseband carrier signal and the adjusted predetermined filter impulse response by synchronizing their maximum peaks using the synchronization time and their opposite phase values resulting in an output aggregated baseband signal wherein each sample is limited within the threshold value.

The filter impulse response of the carrier filter can be calculated in advance and stored. In case of several carriers it is a combined or aggregated impulse response of all carrier filters, each filter modulated to the correct frequency within the multi carrier frequency band. It is only dependent on the carrier configuration.

For each peak or group of peaks is an impulse with the correct amplitude and phase is generated and subtracted. Some peak regrowth can occur so the algorithm can need to be run several times. As the impulse response consists of a group of samples before and after the highest sample the signal needs to be delayed in order to make it possible to subtract the impulse correctly.

Each received sample of the aggregated baseband carrier signal is clocked and its position in the order of samples of the signal is registered and kept as long that the sample is delayed in the peak reduction unit 100.

Figure 14:
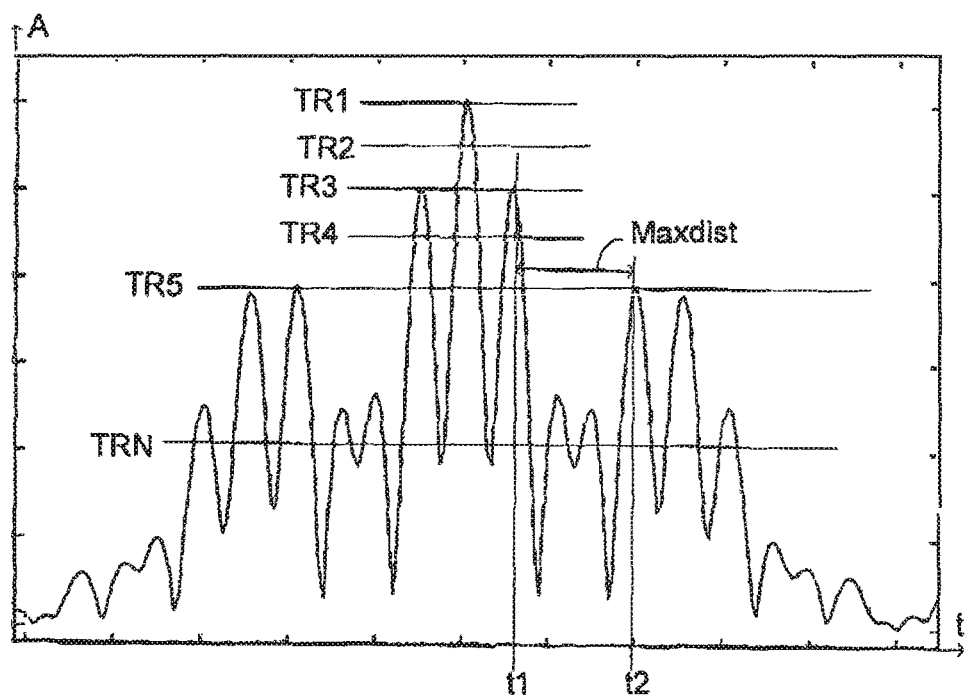
FIG. 14 is a graph diagram illustrating the lowering of levels for determining the maximal distance between neighbouring peaks.

The search length L is pre-determined by means of an algorithm S200 for calculating at different amplitude levels, L1, . . . , LN, the maximum distance, L, of two neighbouring peaks belonging to a group of peaks of the pre-determined filter impulse response, see FIG. 14. Said search length is pre-determined to be long enough to include at least one sample value of the next neighbouring peak within said group of peaks but short enough to exclude any sample value of another group of peaks.

Figure 13:
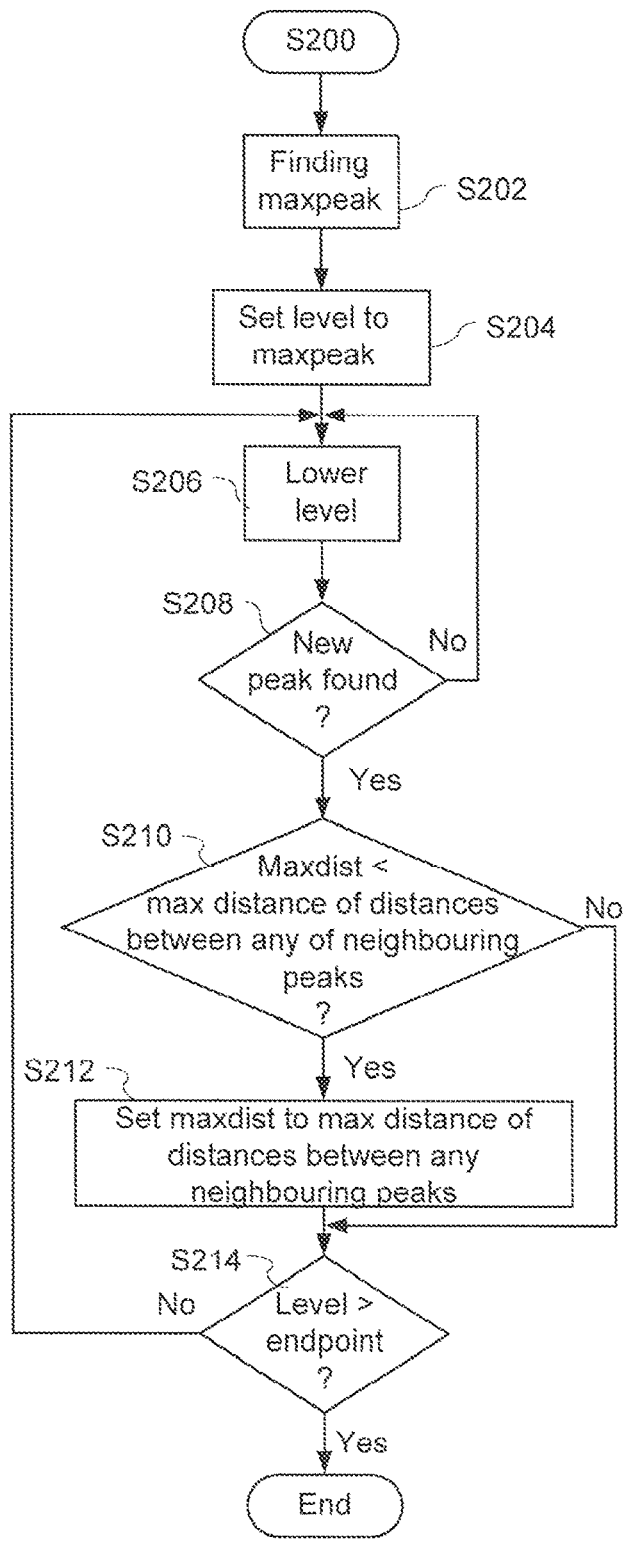
FIG. 13 is flowchart illustrating a method S200 for determining a search length for an impulse response.

Said algorithm S200 is described in more details with reference to FIG. 13.

Figure 9:
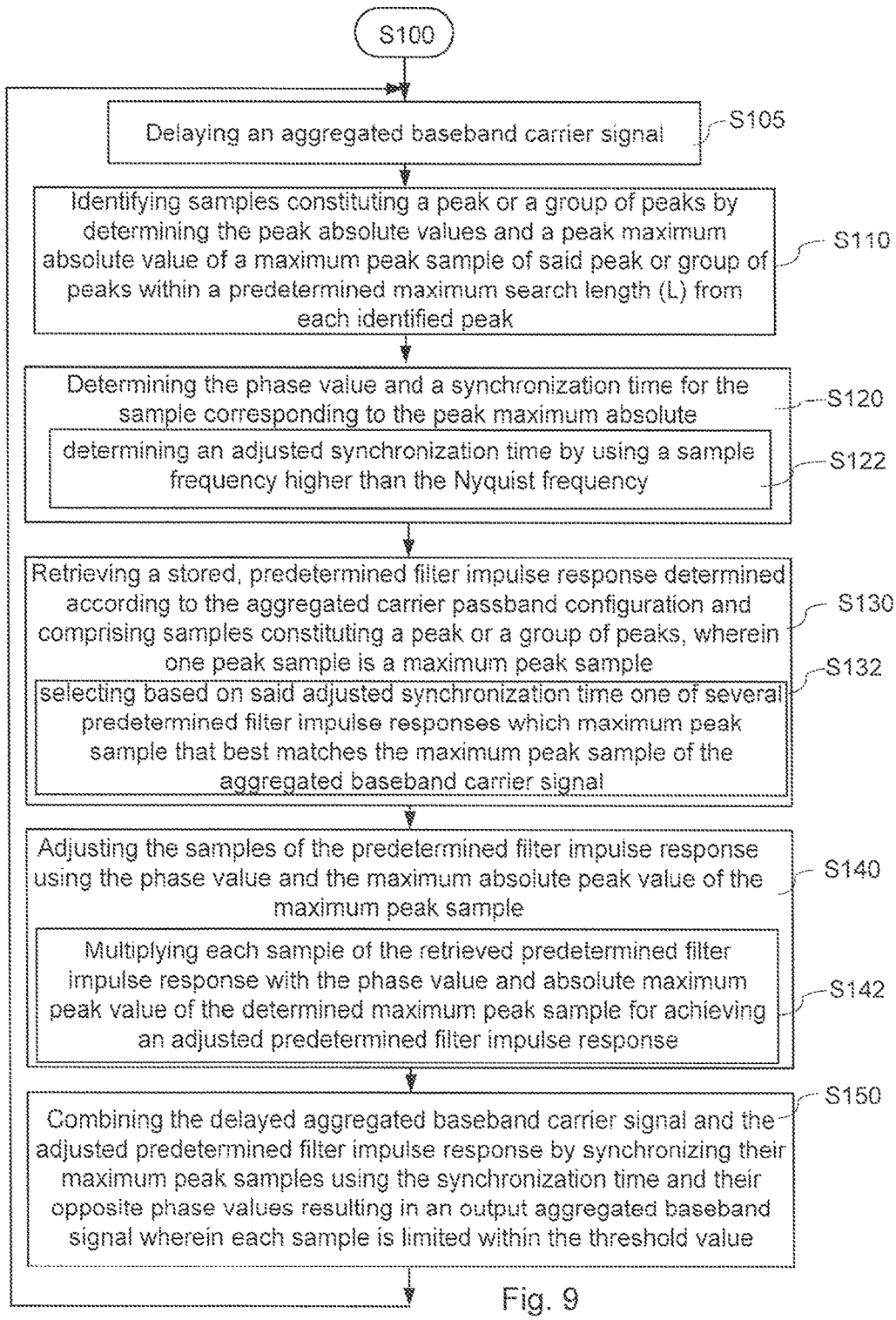
FIG. 9 is a flowchart of an embodiment of the method for peak reduction presented in this disclosure.

FIG. 9 is a flowchart illustrating an embodiment of the method for peak cancellation presented in this disclosure.

According to one embodiment, the method may further comprise:
S122:—Determining an adjusted synchronization time by using a sample frequency higher than the Nyquist frequency;
S132:—Selecting based on said adjusted synchronization time one of several predetermined filter impulse responses which maximum peak sample that best matches the maximum peak sample of the aggregated baseband carrier signal.

The advantage of said embodiment of S132 is that it is possible to select among a plurality of filter impulse responses the filter impulse response whose position of the highest peak, i.e. maximum peak sample, matches the position of the highest peak, i.e. maximum peak sample, in the input signal in the delay buffer. Each PM storage comprises a filter impulse response which is a version of the filter impulse response, sampled at different time positions, adjusted synchronization time, with the Nyquist sample frequency. In this way there will be fewer calculations than if there was only one oversampled filter.

According to further one embodiment of the method, the adjusting step,

S140, may comprise the step of:

S142:—Multiplying each sample of the retrieved predetermined filter impulse response with the phase value and peak maximum absolute value of the determined maximum peak sample for achieving an adjusted predetermined filter impulse response.

Figure 10:
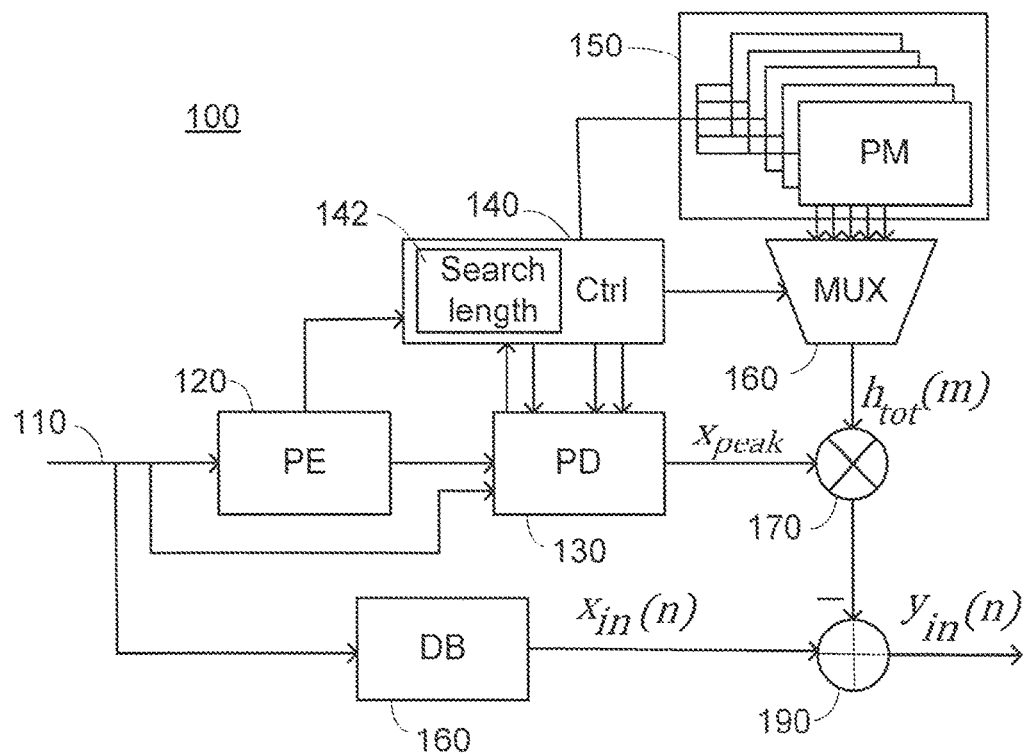
FIG. 10 is a block diagram illustrating an embodiment of a peak reduction unit.

FIG. 10 is a block diagram illustrating an embodiment of a peak reduction unit 100 for implementing peak cancellation according the above described method.

The following described peak reduction unit 100 may be inserted and used in a radio transmitter 10 according to FIG. 1. A radio base station may comprise one or more such radio transmitters.

The peak reduction unit 100 comprises peak extractor 120, peak detector 130, a controller (unit) 140, a pulse memory 150, a delay buffer 160, multiplication unit 170 and combining unit 190. The controller unit 140 may sometimes in this description be denoted as controller.

The peak reduction unit 100 receives an aggregated baseband carrier signal on its input 110. The signal is distributed to a peak extractor 120 and a delay buffer 160.

The aggregated baseband carrier signal $x_{in}(n)$ is fed on the input 110 of the peak reduction unit 100. The aggregated carrier signal $x_{in}(n)$ comprises samples that are one by one distributed in parallel to the delay buffer 160, peak extractor 120 and peak detector 130.

The delay buffer, DB, 160 is configured to delay the received digital signal $x_{in}(n)$ for a time period to enable the peak reduction unit 100 to identify and determine the sample having maximum absolute value $|x_{peak}|$ of one or more peak samples, within said time period. This enables the reduction unit to determine said peak sample's position in the flow of samples, its amplitude and phase values, and further to synchronize a stored filter impulse response based on the used carrier configuration, adjust the stored impulse response by means of the determined amplitude $|x_{peak}|$ and phase $e^{j\varphi_{peak}}$ values and synchronize the position of the sample with the highest amplitude of the signal in the delay buffer and to the position of the sample with the highest amplitude of the adapted impulse response.

The drawback with prior art is that each peak of a signal can consist of a set of sub-peaks (narrow peaks), as illustrated in FIG. 7. The classical peak detector would in this case identify each sub-peak and the algorithm would try to cancel each sub-peak separately. This will be very inefficient.

If each narrow peak of a group of peaks is detected separately the number of peaks will be too high to handle. This is a case that requires a special improved peak reducing device and a different way of cancelling the peak.

Thus, the peak reduction unit 100 is adapted to limit a peak or group of peaks of an aggregated baseband carrier signal to a pre-set threshold value, TR. Said aggregated baseband carrier signal $x_{in}(n)$ comprises digital carrier signals allocated to passbands which are separated by intermediate free frequency bands. Said passbands and intermediate free frequency bands are distributed according to an aggregated carrier passband configuration H(w) in the frequency baseband, wherein one or more samples of the aggregated baseband carrier signal $x_{in}(n)$ form a peak or group of peaks, which samples are complex and have absolute values exceeding the threshold value TR. A peak value comprises a peak absolute value, which is the difference between the absolute value of the corresponding sample and the threshold value TR, and the phase of the corresponding sample. The peak reduction unit 100 comprises a delay buffer 160 for receiving and delaying an aggregated baseband carrier signal, and a controller unit 140 for controlling a peak extractor unit 120, and a peak determination unit 130. The peak extractor unit 120 is adapted to identify samples constituting a peak or a group of peaks by determining the peak absolute values, and the peak determination unit 130 is adapted to determine the peak absolute values within a predetermined search length L from each identified peak and a peak maximum absolute value of said peak or group of peaks within a predetermined search length L from each identified peak.

Said controller unit 140 comprises a processor and/or control logic.

Said processor and/or control logic is adapted to determine a synchronization time for the sample corresponding to the peak maximum absolute value, i.e. maximum peak sample. The synchronization time is based on the position of said maximum peak sample in the delay buffer and the length of the impulse response M. The controller unit is capable of identify position of said maximum peak sample in the delay buffer when said maximum peak sample has been identified.

Said processor and/or control logic is further adapted to retrieve from a storage 150 a stored, predetermined filter impulse response $h_{tot}$ comprising samples constituting a peak or a group of peaks determined according to the aggregated carrier passband configuration H(w), wherein one peak sample is a maximum peak sample.

The multiplication unit 170 is configured to adjust the samples of the predetermined filter impulse response using the phase value $e^{j\varphi_{peak}}$ and the peak maximum absolute value $|x_{peak}|$ of the maximum peak sample.

The combining unit 190 is adapted to combine the delayed aggregated baseband carrier signal and the adjusted predetermined filter impulse response. The controller 140 is adapted to synchronize their maximum peaks by using the synchronization time and their opposite phase values thereby resulting in an output aggregated baseband signal wherein each sample is limited to the threshold value.

The peak reduction unit comprises a counter 142 of the controller 140. The counter 142 may either increment from 0 up to the search length L or start from L and decrement down to 0. It uses the sampling frequency $f_s$ when counting up or down. Thus, the search length L corresponds to a number of samples, or a search time $T=L/f_s$.

The search length is pre-determined by means of an algorithm S200 for calculating at different amplitude levels (L1, . . . , LN) as illustrated in FIG. 14.

The peak determination unit 130 is further adapted to determine an adjusted synchronization time by using a sample frequency higher than the Nyquist frequency. The controller 140 may further be adapted to select based on said adjusted synchronization time one of several predetermined filter impulse responses which maximum peak sample that best matches the maximum peak sample of the aggregated baseband carrier signal. Said several predetermined filter impulse responses are stored in a pulse memory storage PM and the controller 140 may select one of said several predetermined filter impulse responses by controlling and addressing a port of a MUX 160.

The advantage of said embodiment is that it is possible to select among a plurality of filter impulse responses the filter impulse response whose position of the highest peak matches the position of the highest peak in the input signal being delivered from the delay buffer.

The multiplication unit 170 is configured to multiply each sample of the retrieved predetermined filter impulse response with the phase value $e^{j\varphi peak}$ and peak maximum absolute value $|x_{peak}|$ of the determined maximum peak sample, which multiplication results in an adjusted predetermined filter impulse response.

Figure 11:
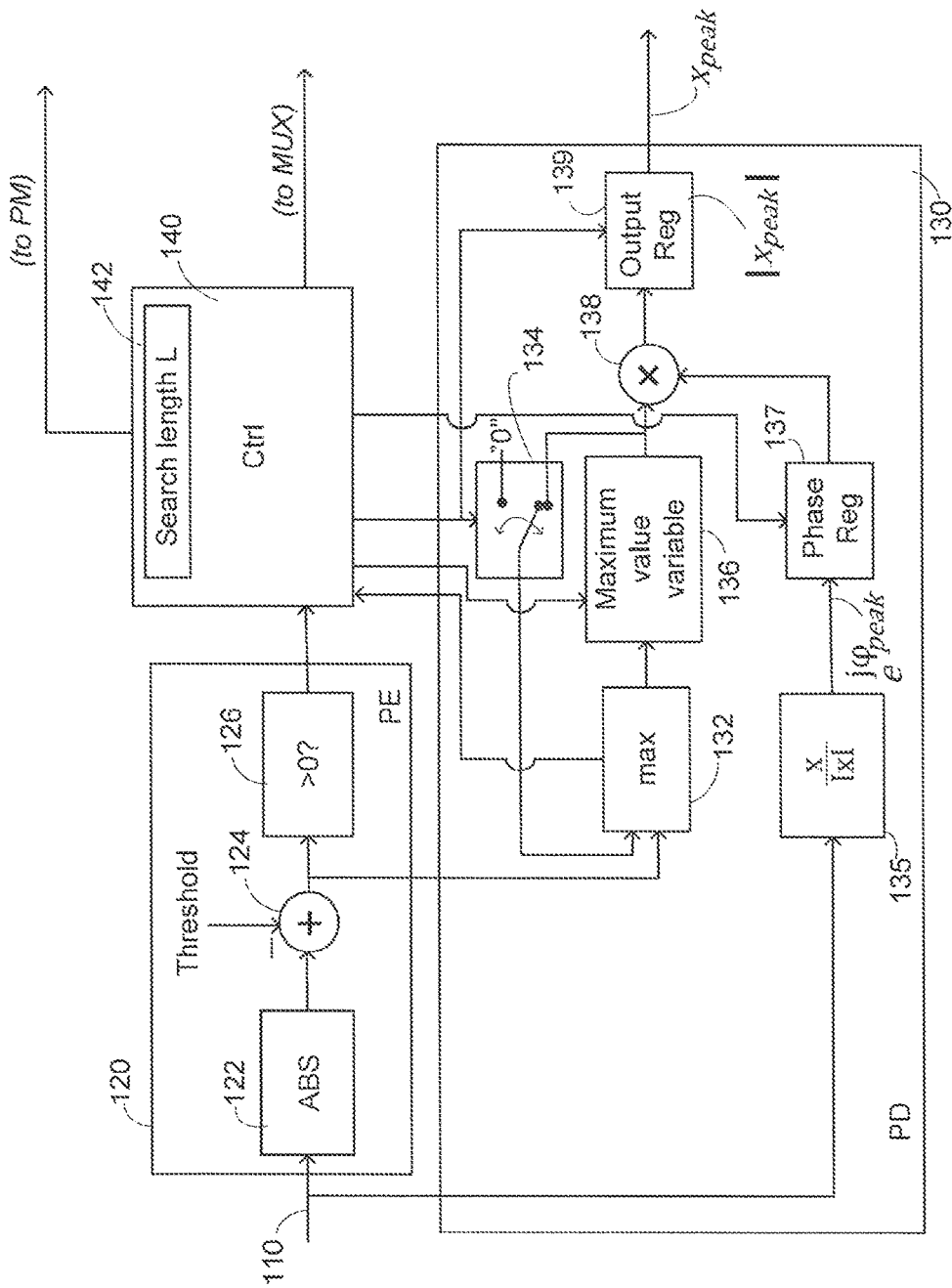
FIG. 11 is a block diagram illustrating an embodiment of the peak extractor and peak detector.

In FIG. 11 is an embodiment of the peak extractor 120 and peak detector 130 of a peak reduction unit, which is illustrated in FIG. 10.

One purpose of the peak extraction is to identify all samples that have an absolute value above the threshold value. For Peak Cancellation it is also necessary to identify the largest sample in each group of samples which amplitudes exceed the threshold value. This is called Peak Detection.

The peak extractor, PE, 120 comprises an absolute value transformer module 122, a threshold comparator 124 and a peak value extractor 126. The absolute value transformer module 122 determines the absolute value of each sample in the aggregated baseband carrier signal. The threshold comparator 124 subtracts the threshold value TR from the absolute value of each sample to determine the peak value. A peak value is the difference between a sample absolute value and the threshold value.

The peak value is fed to the peak value extractor 126 and to the peak detector 130.

The peak extractor 120 extracts peak values higher than the threshold TR. Thus, the extractor 126 separates positive peak values from negative samples. The peak value extractor 126 is connected to the controller 140. The peak value extractor 126 indicates for the controller if a peak value of a sample is positive or negative. The first positive peak value indicates the start of a peak or sub-peak and the first negative value indicates the end of a peak or sub-peak.

The controller 140 uses the peak value indication to start a counter 142 that uses the extra search length L to look for the next peak. I the case of close narrow peaks, such as sub-peaks, the use of a search length after the indication of a peak ending (sample below threshold value TR) enables and improves the possibility the finding of the maximum peak value.

Each extracted peak value is also fed to the peak detector 130. The peak detector 130 comprises a maximum detector 132, a switch 134, a phase detector 135, a temporary storage of a maximum value variable 136, an output register 138 and a combiner 139. The object of the peak detector is to identify the largest sample in each group of samples above the threshold value.

The maximum detector 132 of the peak detector 130 receives a peak value from the peak extractor 120 on one input and an earlier stored peak value determined to be a temporary maximum peak value on a second input. The maximum detector 132 compares the received peak value with the earlier stored peak value determined to be a maximum peak value.

The controller unit 140 is connected to the switch 134. The controller 140 is able to set the maximum detector to zero for restarting the search of a maximum peak when the extra search length has run out after the end of a peak has been detected. During the search for maximum peak values, the switch is set to connect the temporary maximum peak value to second input of the maximum detector.

From the start of a search for a maximum peak value, the second input of the maximum detector is set to zero. If a peak value below the threshold TR is received from the peak extractor, the maximum peak value is set to zero. The storage 136 of a temporary maximum value variable is set to zero from start and will be zero until a positive peak value is detected on the first input of the maximum detector 132. The maximum detector 132 is adapted to determine and select the greater value of the two values on the first and second input, respectively. The maximum detector 132 is synchronized with a phase detector 135 and a phase register 137 via the controller 140. This arrangement secures that a sample's absolute value stored in the maximum value variable storage 136 has its phase value stored in the phase register 137.

During the search for a maximum peak value, the phase register 137 and the maximum value variable storage 136 is automatically updated.

The phase detector 135 is connected to the input 110. The phase detector determines the phase of each sample on the input. The phase detector 135 is synchronized with the maximum detector 132.

The phase detector 135 is adapted to store the correct phase value to the peak value stored in the maximum value variable storage 136 while processing other incoming samples on the input 110. Thus, the phase detector 135 and the maximum detector 132, the maximum value variable storage 136 and the phase register 137 are synchronized to each other.

The maximum value variable storage 136 and the phase register 137 are connected to the combiner 138. When the search length L is ended, the maximum value variable storage 136 and the phase register 137 are stored with the detected maximum peak absolute value $|x_{peak}|$ and phase value $e^{j\varphi peak}$, respectively. The controller 140 is triggered, when the search length L is ended, to trig the maximum value variable storage 136 and the phase register 137, to feed its values to the combiner 138, which multiplies the maximum peak absolute value with its phase value to a complex value that is stored in the output register 139. The stored complex value is used as a correction factor $x_{peak}$ when synchronized and multiplied to the samples of the stored impulse response $h_{tot}(m)$. The result of the adjusted impulse response is used for the peak reduction. Said output signal of the peak detector is fed to the combiner 170, as illustrated in FIG. 10.

The combining unit 190 is adapted to combine the delayed aggregated baseband carrier signal $x_{in}(n)$ and the adjusted predetermined filter impulse response $h_{tot}(m)x_{peak}$. The controller 140 is adapted to synchronize their maximum peak samples by using the synchronization time and their opposite phase values thereby resulting in an output aggregated baseband signal, $y(n)=x_{in}(n)-h_{tot}(m)x_{peak}$ (eq. (2)), wherein each sample is limited to the threshold value.

If the impulse response is M samples long and the maximum peak sample of the impulse response is located in the middle of said response, i.e. (M+1)/2, M is an odd number of samples. The controller unit 140 is adapted to start feeding a stored impulse response $h_{tot}(m)$ when the sample corresponding to the maximum peak value in the delay buffer is (M+1)/2 from being fed from the delay buffer output. The synchronizing time is based on the position of the maximum peak sample in the delay buffer and the length of the impulse response M.

Figure 12:
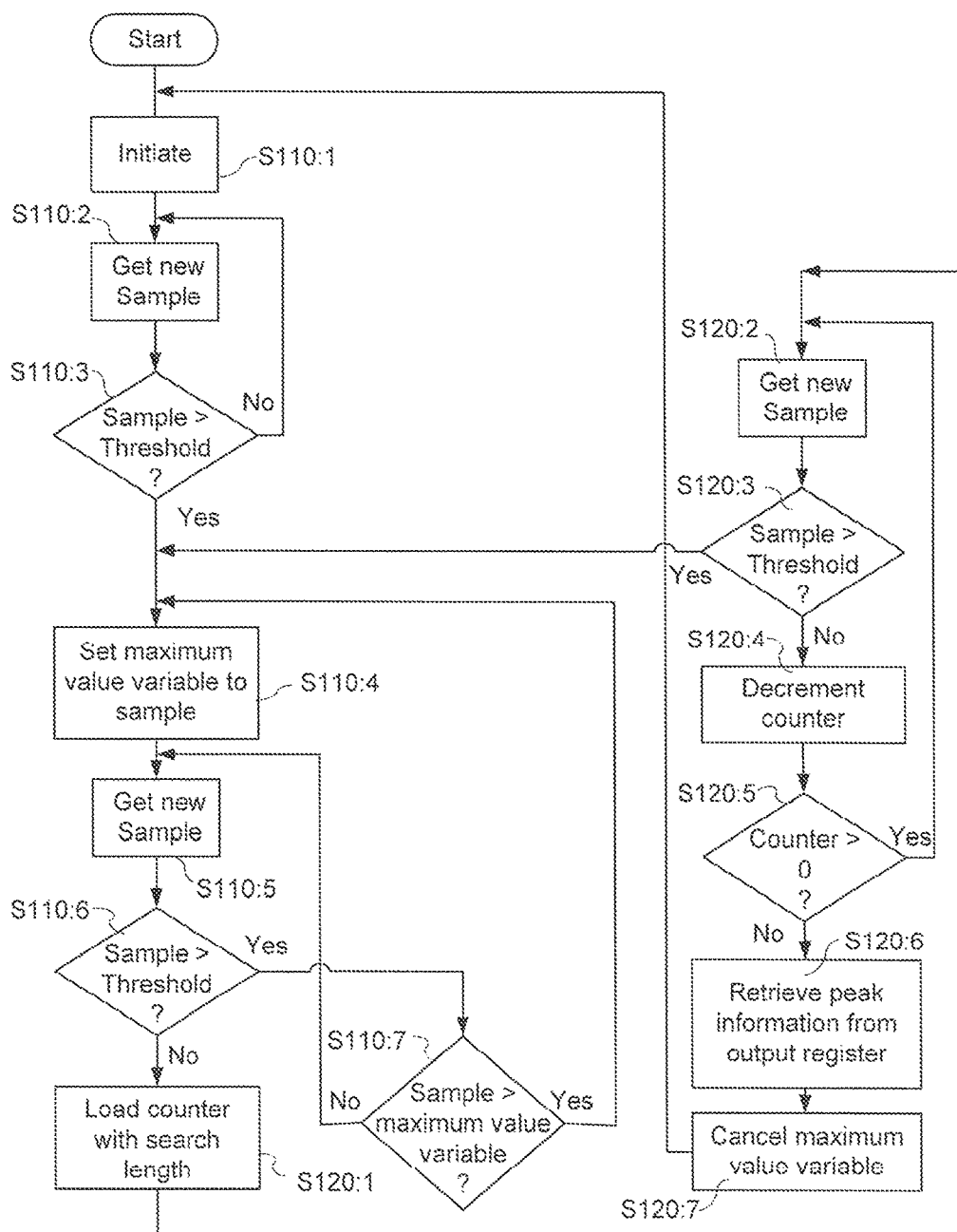
FIG. 12 is a flowchart illustrating an embodiment of method steps of the method.

FIG. 12 is a flowchart illustrating an embodiment of method steps S110 and S120 of the method S100.

At start-up of the method S110, an initiating step S110:1, "Initiate" is performed. Said step may include the setting of parameters, registers and memory storages to a predetermined start value.

In S110:2, "get new sample" is the absolute value of new sample of the input signal received. Said absolute value is compared in step S110:3,"sample>threshold?", to a predetermined threshold value. If the absolute value of the received sample exceeds the threshold value, yes, it will be stored as a maximum value variable in step S110:4, "set maximum value variable to sample value". If the absolute value of the received sample does not exceed the threshold value, no, the absolute value of a new sample of the input signal is compared in step S110:3,"sample>threshold?", to the predetermined threshold value. Steps 110:2 and 110:3 are repeated until an absolute value of a sample exceeds the threshold value, yes, or a search length counter (142 in FIG. 10) stops the search for maximum values. When a new absolute value of a sample exceeds the threshold value, yes, and the absolute value is stored as a maximum value in step S110:4, "set maximum value variable", a new sample is taken care of in step S110:5 and its absolute value is compared in step S110:6,"sample>threshold?". If the absolute value of the received sample exceeds the threshold value, yes, it will be determined in step S110:7 if "sample>maximum value variable", i.e. if absolute sample value exceeds the stored maximum value in the maximum value variable, or not. If the result of the comparison is "no", a new sample absolute value is retrieved in S110:5, and compared to the threshold value in step S110:6. If condition is fulfilled, yes, it will be determined in step S110:7 if "sample>maximum value variable", i.e. if absolute sample value exceeds the maximum value in the stored maximum value variable, or not. If the absolute value of the sample exceeds the stored maximum value, the condition is fulfilled, yes, the absolute value is stored as a maximum value in step S110:4, "set maximum value variable<=sample", a new sample is taken care of in step S110:5 and its absolute value is compared in step S110:6,"sample>threshold?". If no, the method sets in step S120:1 the search length counter to a predetermined search length, e.g. how many extra samples of the input signal should be counted to find if there is any maximum value closer the latest found maximum value than expected.

A new sample absolute value is retrieved in S120:2, and compared to the threshold value in step S120:3. If the absolute value of the sample exceeds the threshold value, the condition is fulfilled, yes, the absolute value is stored as a maximum value in step S110:4, "set maximum value variable to sample", a new sample is taken care of in step S110:5 and its absolute value is compared in step S110:6, "sample>threshold?". If no, the method sets, or load, in step S120:1 the counter to a predetermined search length L, e.g. how many extra samples of the input signal should be counted to find if there is any maximum value closer the latest found maximum value than expected.

If in step S120:3, the absolute value of the sample does not exceed the threshold value, the condition is not fulfilled, no, and the search length counter is decremented one step in S120:4 and as long as the counter value is not zero or less, a new sample absolute value is retrieved in S120:2, and compared to the threshold value in step S120:3.

When the counter value is not zero or less, sample information of the stored absolute value regarding amplitude and phase is retrieved in step S120:6 from the delay buffer e.g. by means of position number of the found peak. Said amplitude and phase of the detected peak value are then used in step S130 of the method.

In step S120:7, the maximum value is cancelled, and the search for a new maximum value can be started in S110:1.

FIG. 13 is flowchart illustrating a method S200 for determining a search length for an impulse response.

The typical shape of a bandlimited impulse response comprising a maximum peak with neighbouring sub-peaks will depend on the carrier configuration. The main peak is the peak having the greatest amplitude. The amplitudes of the neighbouring or surrounding sub-peaks are lower.

In the Peak Cancellation algorithm the impulse response of the combination of all carriers are used to filter the peak sample and form the peak cancellation pulse. The peak cancellation pulse as well as the peak sample is typically complex valued. By investigating the amplitude, i.e. the absolute value, of the impulse response of this peak filter it is possible to determine an optimum search window.

The method starts with the step of finding the maximum peak value of the known and stored impulse response, step S202 "Finding maxpeak". When the maximum peak is localized, the maximum distance between two neighbouring peaks of the impulse response is determined.

A threshold value is used for determining which sample values of the impulse response that exceeds a limit defined by the set threshold value, starting from the amplitude value of the maximum peak, S204, "set limit to maxpeak". In step S206, "Lower limit", the threshold value is lowered with a pre-set increment step. For each new limit, signal values exceeding the limit are determined, S208, "New peak found?". If no new peak is found for a set limit, the limit, threshold value, is lowered with a pre-set increment step, and a new search for peak values is performed until a peak is found, and the condition in S208 is fulfilled, yes. In S210,"Maxdist<max distance between any neighbouring peaks", the distance between neighbouring values are determined. The parameter Maxdist is the so far measured longest distance between two neighbouring peaks. If there is a distance found for the current limit value between two neighbouring peaks that is longer than Maxdist, the new determined distance is set to Maxdist, in step S212, "Set Maxdist to the maximum distance between any neighbouring peaks. In the following step, S214 "Limit>endpoint?", it is checked whether the current limit value that is used is higher than a pre-set endpoint value, or not. The endpoint value is the value where the search for maximum distance is stopped. If no, i.e. the used limit value is higher than the endpoint value, the method returns to step S206, wherein the threshold value is lowered with a pre-set increment step. If yes, the endpoint is reached and the search method S200 is stopped.

If in step S210, there is no distance found for the current limit value between two neighbouring peaks that is longer than Maxdist, the current Maxdist is kept and the check if "Limit>endpoint?" in step S214 is performed.

Thus, the maximum distance at each previous limit is compared to the maximum distance, Maxdist, determined and stored in any of the previous steps until the threshold value reaches the end limit, i.e. the lowest threshold value to be used. The distance between two neighbouring sample values that after the longest in the last step is the maximum distance, Maxdist, between two peaks.

If the search length L, i.e. the amount of time to extend the search for peaks beyond the current sub-peak, is too small, the next small sub-peak is missed. If the search length, L, is too large there is a risk that another peak is detected as a sub-peak and the algorithm will try to cancel both peaks using just one pulse.

FIG. 14 is an amplitude-time diagram illustrating a filter impulse response graph based on a carrier configuration.

A threshold value TRj, j=1, 2, 3, 4 . . . , N, is used for determining which sample values of the impulse response that exceeds the limit TRj defined by the set threshold value, starting from the amplitude value of the maximum peak, S204, "set limit to maxpeak". In step S206, "Lower limit", the threshold value is lowered with a pre-set increment step, to TR2, then TR3, and TR4 down to TRj≤endpoint. For each new limit, signal values exceeding the limit are determined, S208, "New peak found?". If no new peak is found for a set limit, the limit, threshold value, is lowered with a pre-set increment step, and a new search for peak values is performed until a peak is found, and the condition in S208 is fulfilled, yes. In S210,"Maxdist<max distance between any neighbouring peaks", the distance between neighbouring values are determined. The parameter Maxdist is the so far measured longest distance in time between two neighbouring peaks. If there is a distance found for the current limit value TRj between two neighbouring peaks that is longer than Maxdist, the new determined distance is set to Maxdist, in step S212, "Set Maxdist to the maximum distance between any neighbouring peaks.

In the drawing, Maxdist is indicated between two neighbouring sub-peaks on the right side of the main peak. One of the peaks is found when the limit value is TR3 and the second lower peak value at the limit value TR5.

The Maxdist is thus the longest distance of all distances between different neighbouring peaks.

FIG. 15 is a graph diagram illustrating a characteristic example of a filter impulse response comprising one single carrier.

In case of a single carrier there will be no sub-peaks so the extension of the search interval can be set to zero.

FIG. 16 is a graph diagram illustrating a characteristic example of a filter impulse response comprising two carriers.

The amplitude of the pulse in case of two identical carriers, placed at a distance, is illustrated in FIG. 16. In case of two carriers there might be sub-peaks and the search length should be set to a value corresponding to the distance between sub-peaks, i.e. the search for the peak will be extended beyond the duration of the detected sub-peak with this distance.

Figure 17:
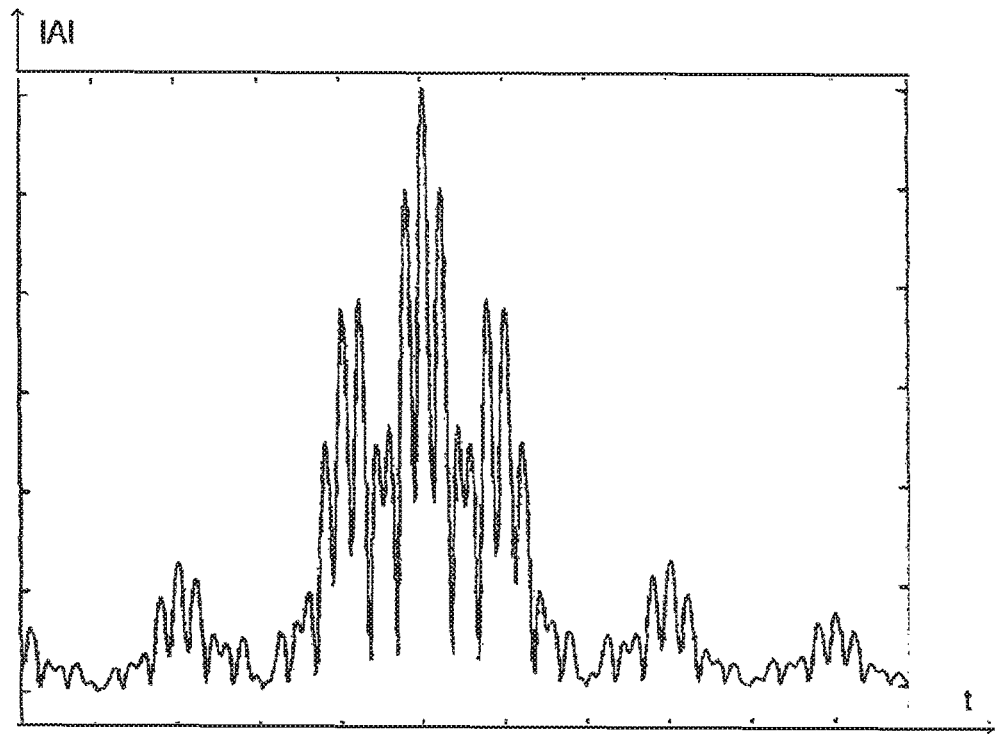
FIG. 17 is a graph diagram illustrating a characteristic example of a filter impulse response comprising three carriers.

FIG. 17 is a graph diagram illustrating a characteristic example of a filter impulse response comprising three carriers.

There are however more complex carrier configurations with more than two carriers and in this case it is not obvious how to select the optimum search window. As illustrated in FIG. 17, the amplitude of a pulse corresponding to three carriers, is asymmetrically placed. In this case a larger search length than the distance between sub-peaks must be used.

The disclosed technique, i.e. method and apparatus, may be implemented in digital electronically circuitry, or in computer hardware, or control logic circuitry in combinations of them.

A number of embodiments of the present technique have been described. It will be understood that various modifications may be made without departing from the scope of the claims. Therefore, other implementations may be within the scope of the following claims.

The invention claimed is:

1. A method for limiting a peak or group of peaks of an aggregated baseband carrier signal to a threshold value, said aggregated baseband carrier signal comprising digital carrier signals allocated to passbands which are separated by intermediate free frequency bands, said passbands and intermediate free frequency bands being distributed according to an aggregated carrier passband configuration in the frequency baseband, wherein one or more samples of the aggregated baseband carrier signal form a peak or group of peaks, which samples are complex having absolute values exceeding a threshold value, a peak value comprising an peak absolute value, being the difference between the absolute value of the corresponding sample and the threshold value, and the phase of the corresponding sample, said method comprising the steps of:

Delaying an aggregated baseband carrier signal;

Identifying samples of the aggregated baseband carrier signal constituting a peak or a group of peaks by determining the peak absolute values and a maximum absolute peak value of said peak or group of peaks within a predetermined search length from each identified peak of a filter impulse response;

Determining the phase value and a synchronization time for the sample of the aggregated baseband carrier signal corresponding to the peak maximum absolute value;

Retrieving a stored, predetermined filter impulse response from among a plurality of predetermined filter impulse responses, the retrieved predetermined filter input response determined according to the aggregated carrier passband configuration and comprising samples constituting a peak or a group of peaks, wherein one peak sample is a maximum peak sample;

Adjusting the samples of the predetermined filter impulse response using the phase value and the peak maximum absolute value of the maximum peak sample to generate an adjusted predetermined filter impulse response; and Combining the delayed aggregated baseband carrier signal and the adjusted predetermined filter impulse response by synchronizing their maximum peak samples using the synchronization time and their opposite phase values resulting in an output aggregated baseband signal wherein each sample is limited within the threshold value.

2. The method according to claim 1, wherein the search length is pre-determined by operation of an algorithm for calculating at different amplitude levels the maximum distance of two neighbouring peaks belonging to a group of peaks of the pre-determined filter impulse response, said search length is pre-determined to be long enough to include at least one sample value of the next neighbouring peak within said group of peaks but short enough to exclude any sample value of another group of peaks.

3. The method according to claim 1, wherein the method further comprises:

determining an adjusted synchronization time by using a sample frequency higher than the Nyquist frequency; and selecting based on said adjusted synchronization time one of several predetermined filter impulse responses which maximum peak sample that best matches the maximum peak sample of the aggregated baseband carrier signal.

4. The method according to claim 1, wherein the adjusting step comprises:

Multiplying each sample of the retrieved predetermined filter impulse response with the phase value and peak maximum absolute value of the determined maximum peak sample for achieving an adjusted predetermined filter impulse response.

5. The method according to claim 1, wherein the aggregated baseband carrier signal comprises several multi standard radio carriers of possibly several types.

6. A peak reduction circuit for limiting peak or group of peaks of an aggregated baseband carrier signal to a threshold value, said aggregated baseband carrier signal comprising digital carrier signals allocated to passbands which are separated by intermediate free frequency bands, said passbands and intermediate free frequency bands being distributed according to an aggregated carrier passband configuration in the frequency baseband, wherein one or more samples of the aggregated baseband carrier signal form a peak or group of peaks, which samples are complex having absolute values exceeding a threshold value, a peak value comprising a peak absolute value, being the difference between the absolute value of the corresponding sample and the threshold value, and the phase of the corresponding sample, the peak reduction circuit comprising:

a delay buffer for receiving and delaying an aggregated baseband carrier signal, a controller for controlling a peak extractor circuit, and a peak determination circuit, wherein the peak extractor circuit, is adapted to identify samples of the aggregated baseband carrier signal constituting a peak or a group of peaks by determining the peak absolute values, the peak determination circuit is adapted to determine a peak maximum absolute value of said peak or group of peaks within a predetermined search length from each identified peak of a filter impulse response and to determine the phase value for the sample of the aggregated baseband carrier signal corresponding to the peak maximum absolute value;

said controller comprising a processor adapted to determine a synchronization time for the sample corresponding to the peak maximum absolute value and to retrieve from a storage a stored, predetermined filter impulse response from among a plurality of predetermined filter impulse responses, the retrieved predetermined filter input response determined according to the aggregated carrier passband configuration and comprising samples constituting a peak or a group of peaks, wherein one peak sample is a maximum peak sample;

a multiplication circuit configured to adjust the samples of the predetermined filter impulse response using the phase value and the maximum peak absolute value of the maximum peak sample to generate an adjusted predetermined filter impulse response;

a combining circuit adapted to combine the delayed aggregated baseband carrier signal and the adjusted predetermined filter impulse response, wherein the controller is adapted to synchronize by using the synchronization time their maximum peaks and their opposite phase values resulting in an output aggregated baseband signal wherein each sample is limited within the threshold value.

7. The peak reduction circuit according to claim 6, wherein the search length is pre-determined by means of an algorithm for calculating at different amplitude levels the maximum distance of two neighbouring peaks belonging to a group of peaks of the pre-determined filter impulse response, said search length is pre-determined to be long enough to include at least one sample value of the next neighbouring peak within said group of peaks but short enough to exclude any sample value of another group of peaks.

8. The peak reduction circuit according to claim 6, wherein the peak determination circuit further is adapted to determine an adjusted synchronization time by using a sample frequency higher than the Nyquist frequency; and the controller further is adapted to select based on said adjusted synchronization time one of several predetermined filter impulse responses which maximum peak sample that best matches the maximum peak sample of the aggregated baseband carrier signal.

9. The peak reduction circuit according to claim 6, wherein the multiplication circuit is configured to multiply each sample of the retrieved predetermined filter impulse response with the phase value and peak maximum absolute value of the determined maximum peak sample for achieving an adjusted predetermined filter impulse response.

10. The peak reduction circuit according to claim 6, wherein the aggregated baseband carrier signal comprises several multi standard radio carriers of possibly several types.

11. A radio transmitter of a radio base station, wherein said radio transmitter comprises the peak reduction circuit according to claim 6.

* * * * *